United States Patent
Yoshihara et al.

(10) Patent No.: US 6,875,836 B2
(45) Date of Patent: Apr. 5, 2005

(54) TRANSPARENT SILICONE FILM-FORMING COMPOSITION AND METHOD FOR CURING SAME

(75) Inventors: Kazutoshi Yoshihara, Koube (JP); Satoshi Sawamura, Okayama (JP)

(73) Assignee: Satoshi Sawamura, Okayama (JP)

( * ) Notice: Subject to any disclaimer, the term of this patent is extended or adjusted under 35 U.S.C. 154(b) by 0 days.

(21) Appl. No.: 10/219,704

(22) Filed: Aug. 15, 2002

(65) Prior Publication Data

US 2003/0069350 A1 Apr. 10, 2003

(30) Foreign Application Priority Data

Aug. 29, 2001 (JP) ........................................ 2001-260084

(51) Int. Cl.$^7$ .............................................. C08G 77/06
(52) U.S. Cl. ........................ 528/18; 528/38; 106/287.11
(58) Field of Search .................. 528/18, 38; 106/287.11

(56) References Cited

U.S. PATENT DOCUMENTS

| | | | | |
|---|---|---|---|---|
| 3,961,977 A | * | 6/1976 | Koda et al. | ........... 106/287 SB |
| 5,514,466 A | | 5/1996 | Yamada et al. | |
| 5,883,185 A | * | 3/1999 | Matsumura et al. | ........ 524/838 |

FOREIGN PATENT DOCUMENTS

| | | |
|---|---|---|
| EP | 0 795 565 | 9/1997 |
| EP | 0 855 614 | 7/1998 |
| JP | 11-235802 | 8/1999 |
| JP | 2001-262065 | 9/2001 |
| JP | 2002-161242 | 6/2002 |

* cited by examiner

Primary Examiner—Margaret G. Moore
(74) Attorney, Agent, or Firm—Flynn, Thiel, Boutell & Tanis, P.C.

(57) ABSTRACT

There is provided a transparent silicone film-forming composition which forms an ultraviolet-absorbing and infrared-screening film exhibiting a film hardness of 6H to 9H or more after curing on a transparent substrate such as glass and plastic. The transparent silicone film-forming composition contains a reaction product of an alkoxysilane having an epoxy group and alkoxysilane having an amino group with an active hydrogen, an acid catalyst, a finely ground ITO cocatalyst and at least one solvent selected from organic solvents. The transparent silicone film-forming composition can also contain a reaction product of an alkoxysilane having an epoxy group and alkoxysilane having an amino group with an active hydrogen as well as tri- or dialkyloxysilane mixed with monoalkoxysilane and/or glycidesilane, an acid catalyst, a finely ground ITO cocatalyst and at least one solvent selected from organic solvents.

6 Claims, No Drawings

TRANSPARENT SILICONE FILM-FORMING COMPOSITION AND METHOD FOR CURING SAME

FIELD OF THE INVENTION

This invention relates to a transparent and opaque silicone film-forming composition which is applied on a transparent substrate such as a plastic or glass used for windows of buildings and vehicles including trains, cars, etc. to form a bright, hard and transparent film without insufficient color uniformity or a colored transparent film, and a method for curing same.

More particularly, this invention relates to a silicone film-forming composition which forms a hard-coat protective film or fashionable film on the surface of window glass of buildings and cars, or plastics such as acrylics and polycarbonates or metals such as aluminum and, at the same time, exhibits ultraviolet and infrared protective properties, and a method for curing the same.

BACKGROUND OF THE INVENTION

It has been conventional to apply UV-absorber loaded plastic films or paints on building or car windows for the purpose of mainly protecting from ultraviolet light.

Further, infrared-screening agents have been similarly used for the purpose of increasing the air conditioning efficiency of buildings or cars.

In the case of these conventional films containing UV-absorbing or IR-screening agents, however, an applying technique or cost thereof becomes a problem, while it is troublesome to cut off them into a desired shape and also difficult to apply them to a complicated part. Further, such films inconveniently keep bubbles when they are applied, while they leave an adhesive when they are torn off. Therefore, it is not sufficiently easy for anyone to handle these films.

Furthermore, a defect of conventional compositions containing UV-absorbing and/or IR-screening agents is that color shading occurs due to insufficient coating uniformity, a coated film hardly cures at room temperature and the strength of the film is weak.

In addition, a curing effect is restricted by a solvent solved in a high polar solvent, which causes interference fringes on the film surface after curing and stickiness of the film surface after drying when a large amount of catalyst is excessively added. Further, the catalyst being added more than some definite amount results in various difficulties such as embrittlement of the film and retardation of curing speed due to deposition of the catalyst or other functional reagents. Even if the film is hardened through curing, the film exhibits less flexible follow-up properties so that peeling of the coated film occurs because the expansion coefficient thereof is different from that of the substrate. Due to less constant catalytic activity of conventional catalysts, the curing time has varied widely case by case, which makes it difficult to control the hardness of the film. On the other hand, there has not been present any composition that has strong adhesion properties to the surface of glass, transparent plastics, metals, etc. and that is cured at ordinary temperatures to form a transparent protective film of pencil hardness more than 6H so as to exhibit a flaw protection effect.

SUMMARY OF THE INVENTION

Accordingly, it is an object of the present invention to provide a novel transparent silicone film-forming composition and a method for curing the same.

A further object of the present invention is to provide a silicone film-forming composition which yields an ultraviolet-absorbing and/or infrared-screening and transparent or colored transparent film which is convenient to handle, has an excellent appearance, and is easy to control with respect to the curing time and hardness thereof, depending on the concentration of a curing catalyst.

Another object of the present invention is to provide a transparent silicone film-forming composition which rapidly cures on a coated surface to form a hard film thereon, and a method for curing the same.

Yet another object of the present invention is to provide a transparent silicone film-forming composition which yields a rapidly curable and room temperature-curable film of excellent leveling properties without causing insufficient coating and color uniformity, the hardness thereof being increased in a short time period after curing, and a method for curing the same.

It has been found by the inventors that a rapidly curable film of high coating properties and excellent curing characteristics at room temperature can be formed from a transparent silicone film-forming composition comprising a reaction product (A) of an alkoxysilane having an epoxy group (a), an alkoxysilane having an amino group with an active hydrogen (b) and an alkoxysilane (c), an acid catalyst (B), a finely ground ITO cocatalyst (C) and at lest one solvent (D) selected from organic solvents, the hardness of the film increasing in a short period of time after curing. The present invention is based on the above mentioned fact. As the thus formed film is quite adhesive to a soft substrate and contains metal particles therein, the film is conveniently conformable to expansion and shrinkage of the substrate in spite of the glassy properties thereof.

The transparent silicone film-forming composition of the present invention may further comprise one or more components (E) selected from ultraviolet-absorbing agents and infrared-screening agents and/or a dye and/or pigment (F).

The most characteristic feature of the present invention resides in the finely ground ITO cocatalyst (C), which allows the rapid curing of the silicone film-forming composition comprising a reaction product (A) of an alkoxysilane having an epoxy group (a), an alkoxysilane having an amino group with an active hydrogen (b) and an alkoxysilane (c) and an acid catalyst (B), even at room temperature.

PREFERRED EMBODIMENTS OF THE INVENTION

A component (A) used in the present invention is a reaction product of an alkoxysilane having an epoxy group (a), an alkoxysilane having an amino group with an active hydrogen (b) and an alkoxysilane (c).

The alkoxysilane having an epoxy group (a) in the component (A) includes γ-glycidoxypropyltrimethoxysilane, γ-glycidoxypropylmethyldimethoxyxysilane, etc.

The alkoxysilane having an amino group with an active hydrogen (b) includes γ-aminopropyltriethoxysilane, N-(β-aminoethyl)-γ-aminopropyltrimethoxysilane, N-(β-aminoethyl)-γ-aminopropyldimethoxysilane, etc., although N-(β-aminoethyl)-γ-aminopropyltrimethoxysilane [$H_2N(CH_2)_2NH(CH_2)_3Si(OMe)_3$] is more preferably used.

When N-(β-aminoethyl)-γ-aminopropyltrimethoxysilane [$H_2N(CH_2)_2NH-(CH_2)_3Si(OMe)_3$] is used as a constituent of the component (A), the resent composition yields a hard film after curing, which is suitable for window glass of cars because no flaw is caused through opening and shutting of the window.

In mixing the alkoxysilane having an epoxy group (a) and the alkoxysilane having an amino group with an active hydrogen (b) (the thus prepared mixture will be referred to as Mixture I), a mixing ratio of both constituents (a) and (b) is preferably in the range of (a):(b)=5:5 to 9:1, and more preferably (a):(b)=5:5 to 8:2 in the mass ratio, respectively.

In mixing the alkoxysilane having an epoxy group (a) and the alkoxysilane having an amino group with an active hydrogen (b) (the thus prepared mixture will be referred to as Mixture II), a formulating ratio of constituents (b) and alkoxysilane (c) may be increased or decreased based on each molar ratio by weight depending on the desired ultimate hardness and drying rate of a composition to be obtained.

In the case of Mixture I, if the mass ratio of the alkoxysilane having an epoxy group is more than 9, it takes time to cure the thus obtained transparent silicone film-forming composition after the coating thereof, while the surface hardness of the film to be formed is low. If the mass ratio of the alkoxysilane having an amino group with an active hydrogen is more than 4, the weather resistance of the thus obtained transparent silicone film-forming composition is reduced.

In the case of Mixture II, the drying rate accelerates as the ratio of the constituent (c) increases, however, which tends to cause cure shrinkage marks on the film after coating, while an increase in the constituent (b) tends to affect an organic functional agent to be added afterward. Considering which is described above, it is important to polymerize these constituents on the basis of an equimolar ratio so as to form a weather-resistant film and improve the hardness thereof sufficiently. Preferably a formulating ratio of constituents (a), (b) and (c) in the range of 3 to 7:4 to 8:1 to 5, each of which is not always an integer.

The transparent silicone film-forming composition used in the present invention may comprise tri- or dialkoxysilane (c) and monoalkoxysilane (d) and/or glycidesilane (e) other than the alkoxysilane having an epoxy group (a) and the alkoxysilane having an amino group with an active hydrogen (b).

In other words, the component (A) may be a reaction product of an alkoxysilane having an epoxy group (a) and an alkoxysilane having an amino group with an active hydrogen (b), with tri- or dialkoxysilane (c) and monoalkoxysilane (d) and/or glycide-silane (e).

In this reaction, such a constituent (c) of the component (A) is trialkoxysilane or dialkoxysilane and typically includes trimethoxymethylsilane, dimethoxydimethylsilane, trimethoxyethylsilane, dimethoxydiethylsilane, triethoxyethylsilane, etc. It has been confirmed that the component improves the surface hardness of a cured film.

Monoalkoxysilane (d) as a constituent of the component (A) includes methoxysilane, ethoxysilane, propoxysilane, butoxysilane, etc.

When an alkoxysilane having an epoxy group (a), an alkoxysilane having an amino group with an active hydrogen (b) and tri- or dialkoxysilane (c) are reacted, preferably the thus obtained product is a product prepared by reacting these constituents (a), (b) and (c) in a mass ratio of (a):(b):(c)=3 to 7:4 to 8:1 to 5. It is more preferable to form a further product by adding afterward 0.1 to 20% of monoalkoxysilane (d) and/or glycidesilane (e) in a mass ratio to the constituents (c) so as to fit for various uses.

The most preferable range of such constituents is (a):(b):(c)=5 to 7:6 to 8:3 to 8. With regard to other constituents, it is preferable to add (d) and/or (e) in a mass ratio of 0.1 to 20% to the constituents (c), respectively.

If the mass ratio of alkoxysilane having an epoxy group (a) is high, it takes time to cure the thus obtained transparent film-forming composition so that the surface hardness of the film is reduced. On the other hand, if the mass ratio of the alkoxysilane having an amino group with an active hydrogen (b) is high, the weather resistance of the film formed from the transparent or translucent film-forming composition is reduced.

Further, if the mass ratio of tri- or dialkoxysilane (c) is high, the curing rate of the film formed from the transparent or translucent film-forming composition is accelerated to reduce the coating workability.

An acid catalyst used in the present invention includes any compound such as sulfuric acid, nitric acid, organo-phosphorus compounds and p-toluenesulfonic acid, which can promote hydrolysis of a hydrophilic alkoxysilane having a hydroxyl group at room temperature to form a silanol of a higher reactivity, and then promote condensation-polymerization thereof, although boron trifluoride is preferably used as the catalyst.

A finely ground ITO cocatalyst, Indium-Tin Oxide, as the component (C) of the present composition allows the rapid curing of the silicone film-forming composition comprising a reaction product (A) of an alkoxysilane having an epoxy group (a) and an alkoxysilane having an amino group with an active hydrogen (b) and an acid catalyst (B) even at room temperature. It is considered that ITO plays a role as a cocatalyst for curing when the silicone film-forming composition is cured in the presence of the acid catalyst.

It has become clear that the hardness of the thus cured film goes up to a pencil hardness of 6H to 9H or more.

Further, the finely ground ITO cocatalyst does not result in any haze nor turbidity, and lack of transparency nor surface lubricating properties.

In general, commercially available ITO having a particle size of 10 to 30 nm is preferably used.

A solvent used in the present invention basically includes alcoholic solvents, Cellosolve solvents, hydrophilic solvents having more than two functional groups and organic polar solvents, and typically those solvents such as isobutyl alcohol, diethylene glycol diether ether, diisobutyl ketone, propylene glycol monoethyl ether acetate, dipropylene glycol monomethyl ether propanol, etc.

The above mentioned propylene glycol monoethyl ether acetate includes 1-ethoxy-2-propylacetate and 2-ethoxy-1-propylacetate, while a mixture of 2-propyl- and 1-propylacetates in a ratio of 90% or more than 10% or less, respectively.

The organic polar solvents may basically include any organic solvents of high polarity, although dipropylene glycol monomethyl ether propanol, (2-methoxymethylethoxy)dimethylformamide or N-methylpyrrolidone is preferably used.

There may be used an organic acid, alcohol, ketone, etc. to improve the solubility of the acid catalysts and dyes.

A wide range of ultraviolet-absorbing agents may be used in the present invention. When the properties of the film tearing off by alkaline reagents, i.e. alkali-repellency, is required, there may be selected an alkali-soluble ultraviolet-absorbing agent from benzophenone- or benzotriazole type.

Typically, such an ultraviolet-absorbing agent includes 2-hydroxy-4-methoxy-benzophenone, 2,4-dihydroxy-benzophenone, 2,2',4,4'-tetrahydroxybenzophenone, 2-hydroxy-4-methoxybenzophenone-5-sulfonic acid, etc.

For the purpose of providing alkali-repellency, there may be used a benzophenone type other than those agents described above or benzotriazole type as an ultraviolet-absorbing agent.

An infrared-screening agent used in the present invention may be inorganic- or organic type agents. There are two kinds of infrared screening agents; infrared reflecting and infrared absorbing types.

The infrared-reflecting type includes, for example, perylene black pigments available from BASF and other companies, while with regard to the infrared absorbing agent, there may be preferably used organic pigments such as aniline or polyaniline type available from Nippon Carlit Co., Ltd., or cyanine or phthalocyanine type available from Nippon Shokubai Co., Ltd.; and inorganic compounds such as zinc oxide, ITO and ATO, or metal complexes of Cu, Ag, Fe and Mn and other copper complexes, which are available from Kureha Chemical Co., Ltd. as ULA-02 or ULA-01 and effective in the wave range from 600 nm.

An amount of the ultraviolet-absorbing agent and/or infrared-screening agent used in the present invention as the component (E) is 1 to 45% by mass of the transparent or translucent film-forming composition (A). If the ultraviolet-absorbing agent and/or infrared-screening agent is less than 1% by mass, the ultraviolet-absorbing effect becomes weak and the film repellency is decreased. On the other hand, an amount thereof more than 45% by mass not only decreases the resistance to water and chemicals such as an oil film cleaner but causes a blooming or bronzing phenomenon. Thus, an amount of 1.5 to 20% by mass is desirable from a viewpoint of practice.

The component (F) used in the present invention is selected from dyes and/or pigments of high weather resistance. Examples of useful dyes include a direct dye such as C.I. Direct Yellow 98, C.I. Direct Red 220 and C.I. Direct Blue 77, and an acid dye such as C.I. Acid Yellow 112, C.I. Acid Red 256 and C.I. Acid Blue 182. While, examples of useful pigments include an inorganic pigment such as C.I. Pigment Yellow 157, C.I. Pigment Red 101 and C.I. Pigment Blue 29 and an organic pigment such as C.I. Pigment Yellow 154, C.I. Pigment Red 122 and C.I. Pigment Blue 15:1. Such a dye and/or pigment may be used independently or in combination thereof. There may be properly used fluorescent pigments for assuming fluorescent colors, luminescent pigments which continuously glow after discontinuing irradiation, pearlescent pigments for assuming a pearl effect, thermo-color pigments which change color depending on the temperature, hydrophilic pigments for providing hydrophilic properties, functional pigments which reflect infrared light or heat rays, etc., if necessary. Various pigments are included as in the following: a fluorescent pigment comprising Acid Yellow 73 dissolved in an acrylic resin; a luminescent pigment comprising strontium aluminate as the chief ingredient; a pearlescent pigment comprising mica coated with titanium dioxide as the chief ingredient; a thermo-color pigment comprising microcapsulated Rhodamine B lactam/isooctyl gallate/cetyl alcohol, a hydrophilic pigment comprising silica and titania as the chief ingredients; and the like.

In the transparent silicone film-forming composition of the present invention, it is preferable to add a stabilizing agent (G) for an odd electron pair of a nitrogen atom, which would probably be derived from the alkoxysilane having an amino group with an active hydrogen, so as to prevent a reaction of the odd electron pair with the ultraviolet-absorbing agent, infrared-screening agent, dye, etc.

Such a stabilizing agent (G) includes various kinds of compounds in which salicylic acid, fumaric acid, crotonic acid, succinic acid, tararic acid, p-hydroxy-benzoic acid, pyrogallol, resorcinol, etc. are preferable used.

The stabilizing agent (G) may either be used singly or in combination.

A photo-stabilizing agent used in the present invention includes [2,2'-Thiobis(4-tert-octylphenolate)]-2-ethylhexylamine nickel (trade name of Viosorb; molecular weight: 635) represented by the following chemical formula:

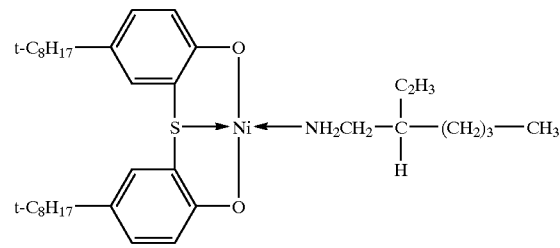

and nickel dibutyl dithiocarbamate (trade name of Antigene NBC; molecular weight: 407) represented by the following chemical formula

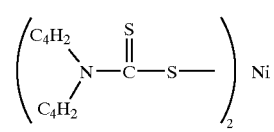

Further, another photo-stabilizing agent used in the present invention includes [N-acetyl-3-dodecyl-1 (2,2,6,6-tetramethyl-4-piperidinyl) pyrolidone-2,5-dione (tradename of Sanduvor 3058) represented by the following chemical formula:

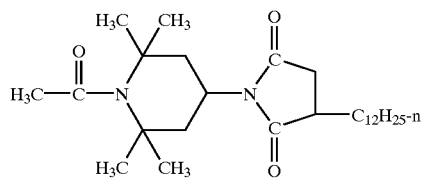

It is necessary to remove dirt of oil, wax, etc. on the surface of a transparent substrate such as glass before coating. Although there are various conventional manners for removing such an oil film, an oil film stripping compound is used in a desirable manner.

The transparent silicone film-forming composition of the present invention may be applied by means of a brush, felt, non-woven fabric, spray gun, etc.

It is desirable to apply the present composition in the direction of gravity so that non-uniformity of the coating seldomly results.

Further, the transparent silicone film-forming composition may be applied by means of a spray gun in which its nozzle opening and closing time is controlled by a computerized nozzle valve.

The present composition is applied on a transparent substrate such as glass at room temperature to form a hard film of dry to touch hardness within 0.3 to 1 hour and then yields a beautiful, transparent and solid cured film having a pencil hardness of 6H to 9H or more after drying for 12 to 24 hours.

In the case of a specific transparent silicone film-forming composition of the present invention which comprises an alkali soluble ultraviolet-absorbing agent, a cured film formed by applying the composition on a substrate such as glass can be repeatedly applied after peeling the film from the substrate when color degradation or a decrease in ultraviolet-absorbing effect occurs. An alkali agent is used as a stripping agent in such a case.

Preferably, the pH of the alkali agent is more than 9, because the permeability thereof into the film would decrease at a pH 9 or less. One or more nonionic surfactants may be added to the alkali agent if penetration thereof or cleaning of the film is hardly done by the agent alone.

Examples of the alkali agent include anionic surfactants; sodium- or potassium bicarbonate, sesquicarbonate, carbonate, metasilicate, orthosilicate, phosphate, pyrophosphate, tripolyphosphate, metaborate, borate, etc.; a water-soluble aminoalcohol such as triethanolamine, diethanolamine, monoethanolamine, methyldiethanolamine, ethyldiethanolamine and monoisopropanolamine; and aqueous ammonium. The alkali agent may be prepared by dissolving one or more of the above-mentioned compounds in water to adjust the pH value to more than 9.

Further, the alkali agent may be combined with an abrasive agent, or used together with a sponge or another suitable material containing such an abrasive agent to slightly rub the film surface.

Embodiments of the present invention will be summarized as in the following:

(1) A transparent silicone film-forming composition comprising a reaction product (A) of an alkoxysilane having an epoxy group (a) and an alkoxysilane having an amino group with an active hydrogen (b), an acid catalyst (B), a finely ground ITO cocatalyst (C) and a solvent selected from organic solvents (D).

(2) A transparent silicone film-forming composition comprising a reaction product (A) of an alkoxysilane having an epoxy group (a) and an alkoxysilane having an amino group with an active hydrogen (b) as well as tri- or dialoxysilane (c) mixed with monoalkoxysilane (d) and/or glycidesilane (e), an acid catalyst (B), a finely ground ITO cocatalyst (C) and a solvent selected from organic solvents (D), and a transparent silicone film-forming composition described in the above item (1).

(3) A transparent silicone film-forming composition described in the above item (2) comprising a reaction product prepared by reacting an alkoxysilane having an epoxy group (a), an alkoxysilane having an amino group with an active hydrogen (b) and an alkoxysilane in a mass ratio of 3 to 7:4 to 8:1 to 5, followed by further adding thereto monoalkoxysilane (d) and/or glycidesilane (e) in a mass ratio of 0.1% to 20% to the constituent (c) depending on a purpose thereof to be used for.

(4) A transparent silicone film-forming composition described in either one of the above items 1 to 3 further comprising one or more than two components (E) selected from ultraviolet-absorbing agents, infrared-screening or infrared-absorbing agents and a dye and/or pigment (F).

(5) A transparent silicone film-forming composition described in either one of the above items 1 to 4 in which the alkoxysilane having an amino group with an active hydrogen (b) is N-(β-aminoethyl)-γ-aminopropyltrimethoxysilane.

(6) A transparent silicone film-forming composition described in either one of the above items 1 to 5 comprising one or more solvents selected from alcoholic-, ketone type-, ether type solvents, and solvents having two or more functional groups as an essential component.

(7) A transparent silicone film-forming composition described in either one of the above items 1 to 6 comprising one or more organic compounds selected from an organophosphorus compound, salicylic acid, fumaric acid, croton acid, succinic acid and tartaric acid as a stabilizing agent (G).

(8) A method for curing a transparent silicone film-forming composition described in either one of the above items 1 to 7 in which a film-forming component is cured by using an acid catalyst and a finely ground ITO cocatalyst as a curing catalyst.

(9) A method for curing a transparent silicone film-forming composition in which a finely ground ITO cocatalyst (C), at least one solvent selected from organic solvents (D), one or more compounds selected from ultraviolet-absorbing agents, infrared-screening or infrared-absorbing agents (E) and a dye and/or pigment component (F) comprising a transparent silicone film-forming composition described in either one of the above items 1 to 7 are separated and kept in another vessel, mixed immediately before application with a reaction product (A) of an alkoxysilane having an epoxy group (a) and an alkoxysilane having an amino group with an active hydrogen (b) as main components and an acid catalyst (B) to form a liquid mixture thereof, and then applied to a pretreated surface of transparent substrate followed by curing.

The present invention will be further described in the following examples.

EXAMPLES

Example 1

(1) γ-Glycidoxypropyltrimethoxysilane in an amount of 85 g, 80 g of γ-amino-propyltriethoxysilane and 50 g of methyltrimethoxysilane were mixed, stirred for one hour and then allowed to stand in a constant temperature room at 25° for fourteen days for aging to yield a reaction product.

(2) In 20 g of propylene glycol monoethyl ether acetate, 5 g of 2,4-dihydroxy-benzophenone was dissolved.

(3) In 10 g of dipropylene glycolmonomethyl ether acetate, 0.2 g of boron trifluoride piperidine was dissolved.

(4) In 5 g of propylene glycol monoethyl ether acetate, 0.5 g of ITO having a particle size of 25 nm (Indium TinOxide; available from Fuji Titanium Co., Ltd.) is dispersed.

(5) Each liquid obtained in steps (3) and (4) were mixed with a solution of step (2) and then homogeneously mixed with 20 g of a solution obtained in the step (1) to form a transparent silicone film-forming composition (I).

Control Example 1

A control sample (1') of transparent silicone film-forming composition was prepared in a similar manner as described in Example 1 except that a dispersion of step (2) was not added.

Example 2

(6) γ-Glycidoxypropyltrimethoxysilane in an amount of 85 g, 80 g of γ-amino-propyltriethoxysilane and 50 g of methyltrimethoxysilane were mixed, and stirred and aged similarly as described in the step (1) above to yield a reaction product.

(7) A solution similar to the step (2) but excluding 2,4-di hyroxybenzophenone (2') and that of step (3) were prepared in a similar manner as described in Example 1, while each liquid of steps (3) and (4) was mixed with the solution of step (2') and then homogeneously mixed with 20 g of the product of step (6) to form a transparent silicone film-forming composition (II).

Control Example 2

A control sample (II') of a transparent silicone film-forming composition was prepared in a similar manner as described in Example 2 except that a dispersion of step (2) was not added.

Example 3

(8) γ-Glycidoxypropyltrimethoxysilane in am amount of 85 g, B0 g of γ-amino-propyltriethoxysilane and 50 g of methyltrimethoxysilane were mixed, and stirred and aged similarly as described in the step (1) above to yield a reaction product.

(9) In 20 g of propylene glycol monoethyl ether acetate, 5 g of 2,2,4,4-tetra-hydroxybenzophenone was dissolved.

(10) Each liquid obtained in steps (3) and (4) were mixed with a solution of step (9) and then homogeneously mixed with 20 g of a solution obtained in the step (8) to form a transparent silicone film-forming composition (III).

Control Example 3

A control sample (III') of a transparent silicone film-forming composition was prepared in a similar manner as described in Example 3 except that a dispersion of step (2) was not added.

Example 4

(11) To 65 g of γ-Glycidoxypropyltrimethoxysilane and 35 g of γ-amino-propyltriethoxysilane, 23 g of methyltrimethoxysilane was mixed, stirred for one hour and then allowed to stand in a constant temperature room at 25° C. for fourteen days for aging to yield a reaction product. Further, the thus yielded product was mixed with 0.92 g of methoxysilane and allowed to stand in the constant temperature room at 25° C. for three days.

(12) In 20 g of propylene glycol monoethyl ether acetate, 0.05 g of 2,4-di-hydroxybenzophenone was dissolved.

(13) In 10 g of dipropylene glycolmonomethyl ether acetate, 0.2 g of boron trifluoride piperidine was dissolved.

(14) In 5 g of propylene glycol monoethyl ether acetate, 0.5 g of ITO having a particle size of 30 nm (Indium TinOxide; availble from Fuji Titanium Co., Ltd.) was dispersed.

(15) Each liquid obtained in steps (13) and (14) was mixed with a solution of step (12) and then homogeneously mixed with 20 g of a solution obtained in the step (11) to form a transparent silicone film-forming composition (IV).

Control Example 4

A control sample (IV') of a transparent silicone film-forming composition was prepared in a similar manner as described in Example 4 except that a dispersion of step (14) was not added.

Example 5

(16) To 53 g of γ-Glycidoxypropyltrimethoxysilane and 29 g of γ-amino-propyltriethoxysilane, 18 g of methyl trimethoxysilane was mixed, stirred for one hour and then allowed to stand in a constant temperature room at 25° C. for fourteen days for aging to yield a reaction product. Further, the thus yielded product was mixed with 0.72 g of methoxysilane and allowed to stand in the constant temperature room at 25° C. for three days.

(17) In 20 g of propylene glycol monoethyl ether acetate, 0.05 g of 2,4-dihydroxybenzophenone was dissolved.

(18) In 10 g of dipropylene glycolmonomethyl ether acetate, 0.2 g of boron trifluoride piperidine was dissolved.

(19) Each liquid obtained in steps (18) and (14) were mixed with a solution of step (17) and then homogeneously mixed with 20 g of a solution obtained in the step (16) to form a transparent silicone film-forming composition (V).

Control Example 5

A control sample (V') of transparent silicone film-forming composition was prepared in a similar manner as described in Example 5 except that a dispersion of step (14) was not added.

Example 6

(19) To 40 g of γ-Glycidoxypropyltrimethoxysilane and 70 g of γ-amino-propyltriethoxysilane, 20 g of methyl trimethoxysilane was mixed, stirred for one hour and then allowed to stand in a constant temperature room at 25° C. for fourteen days for aging to yield a reaction product, which was subsequently mixed with 0.92 g of glycidesilane and allowed to stand in the constant temperature room at 25° C. for three days.

(20) In 20 g of propylene glycol monoethyl ether acetate, 0.05 g of 2,4-di-hydroxybenzophenone, 0.01 g of nickel dibutyldithiocarbamate and 0.03 g of 2,6-di-tert-butyl-4-methylphenol were dissolved.

(21) In 10 g of a mixed solution containing 2 g of N-methyl-2-pyrrolidone and 8 g of dipropylene glycol monomethyl ether propanol, 0.2 g of boron trifluoride piperidine was dissolved.

(22) Each liquid obtained in steps (21) and (14) were mixed with a solution of step (20) and then homogeneously mixed with Perylene Black pigment and a solution obtained in the step (19) in an amount of 20 g to form a transparent silicone film-forming composition (VI).

Control Example 6

A control sample (VI') of transparent silicone film-forming composition was prepared in a similar manner as described in Example 5 except that a dispersion of step (14) was not added.

Composition of these products will be shown in detail in Table 1 below.

TABLE 1

| | Component | (A) | (B) | (C) | (D) | (E) | (F) |
|---|---|---|---|---|---|---|---|
| Example 1 | (a) | 85 g | $BF_3$ | ITO 1 | PGMA | DHB | — |
| | (b) | 15 g | | | DPMP | | |
| Control 1 | (a) | 85 g | $BF_3$ | — | PGMA | DHB | — |
| | (b) | 15 g | | | DPMP | | |
| Example 2 | (a) | 65 g | $BF_3$ | ITO 1 | PGMA | — | — |
| | (b) | 35 g | | | DPMP | | |
| Control 2 | (a) | 65 g | $BF_3$ | — | PGMA | — | — |
| | (b) | 35 g | | | DPMP | | |
| Example 3 | (a) | 75 g | $BF_3$ | ITO 1 | PGMA | THB | — |
| | (b) | 25 g | | | DPMP | | |
| Control 3 | (a) | 75 g | $BF_3$ | — | PGMA | THB | — |
| | (b) | 25 g | | | DPMP | | |
| Example 4 | (a) | 65 g | $BF_3$ | ITO 2 | PGMA | DHB | — |
| | (b) | 35 g | | | DPMP | | |
| | (c) | 23 g | | | | | |
| | (d) | 0.92 g | | | | | |
| | (e) | — | | | | | |
| Control 4 | (a) | 65 g | $BF_3$ | — | PGMA | DHB | — |
| | (b) | 35 g | | | DPMP | | |
| | (c) | 23 g | | | | | |

TABLE 1-continued

| | Component (A) | | (B) | (C) | (D) | (E) | (F) |
|---|---|---|---|---|---|---|---|
| | (d) | 0.92 g | | | | | |
| | (e) | — | | | | | |
| Example 5 | (a) | 53 g | BF$_3$ | ITO 2 | PGMA | DHB | D1 |
| | (b) | 29 g | | | DPMP | | |
| | (c) | 18 g | | | | | |
| | (d) | 072 g | | | | | |
| | (e) | — | | | | | |
| Control 5 | (a) | 53 g | BF$_3$ | — | PGMA | DHB | D1 |
| | (b) | 29 g | | | DPMP | | |
| | (c) | 18 g | | | | | |
| | (d) | 072 g | | | | | |
| | (e) | — | | | | | |
| Example 6 | (a) | 40 g | BF$_3$ | ITO 2 | PGMA | DHB | P 1 |
| | (b) | 70 g | | | DPMP | TBF | |
| | (c) | 20 g | | | NMP | P 1 | |
| | (d) | — | | | | | |
| | (e) | 0.92 g | | | | | |
| Control 6 | (a) | 40 g | BF$_3$ | — | PGMA | DHB | P 1 |
| | (b) | 70 g | | | DPMP | TBF | |
| | (c) | 20 g | | | NMP | P 1 | |
| | (d) | — | | | | | |
| | (e) | 0.92 g | | | | | |

(a) γ-Glycidoxypropyltrimethoxysilane
(b) γ-aminopropyltriethoxysilane
(c) trimethoxymethylsilane
(d) methoxysilane
(e) glycidesilane
ITO 1: ITO dispersion having an average particle size of 25 nm (available from Fuji Titanium Co., Ltd.)
ITO 2: ITO dispersion having an average particle size of 30 nm (available from Fuji Titanium Co., Ltd.)
DPMP: dipropylene glycol monomethyl ether propanol
PGMA: propylene glycol monoethyl ether acetate
NMP: N-methyl-2-pyrrolidone
DHB: 2,4-dihydroxybenzophenone
THB: 2,2,4,4-tetrahydroxybenzophenone
TBF: 2,6-di-tert-butyl-4-methylphenol
D1: C.I. Direct Blue 77
P1: C.I. Perylene Black pigment Reference Examples 1 to 4

ITO dispersion obtained in the step (4) above was added to various commercial transparent film-forming compositions to form reference compositions.

Reference Example 1

The finely ground ITO dispersion was added to a commercial acrylic paint in the same ratio as Example 1 (mass ratio to solid component).

Reference Example 2

The finely ground ITO dispersion was added to a commercial polycarbonate paint in the same ratio as Example 1 (mass ratio to solid component).

Reference Example 3

The finely ground ITO dispersion was added to a commercial polyvinyl acetal paint in the same ratio as Example 1 (mass ratio to solid component).

Reference Example 4

The finely ground ITO dispersion was added to a commercial cellulose lacquer in the same ratio as Example 1 (mass ratio to solid component).

Using the transparent silicone film-forming compositions prepared in the Examples, Control Examples and Reference Examples, application on a glass substrate and curing of the thus formed films will be detailed in the following.

Oil Film Removal Process

An oil film cleaning compound is spread on an abrasive sponge containing a small amount of water to scour all over the surface of a glass substrate. The glass is wiped with water and sponge thoroughly to confirm that the oil film is completely removed. As the oil film is still on the glass if water drops do not appear thereon, the above mentioned procedure should be repeated using the oil film cleaning compound until the glass surface gets wet all over. Water and the compound are then wiped off completely, while the glass surface is further cleaned with a non-woven fabric of several folds and isopropyl alcohol to remove the oil.

Application Process of Transparent Silicone Film-forming Compositions

To a tray having a volume of 150 ml (50 mm/W×150 mm/L×20 mm/D), about 30 ml of a solution of the transparent silicone film-forming compositions prepared as examples is poured and soaked into only an oblique section of a melamine foam sponge.

While holding the sponge tight, the thus soaked solution is applied to the glass substrate slowly from the right or left top to the bottom in the direction of gravity to form a belt-like coat. After the sponge has reached the bottom, a similar procedure is repeated from the top to the bottom in the direction of gravity, thereby about one third to one fourth of each coat being overlapped, until the glass substrate is coated homogeneously as a whole.

Drying Process

After the application is completed, the coated glass substrate is kept in a suitable space without the influence of moisture and dust to proceed by air drying. In general, the coated film is dry to the touch when the coated surface does not stick to fingers, within about ten minutes in summer and about 30 minutes in winter (dry to the touch). The coated film is almost completely dries up after being allowed to stand for about 24 hours so that the film formed on the glass substrate, such as a window, is not scratched through taking care thereof with a soft cloth.

Film properties of various transparent silicone film-forming compositions prepared as examples were evaluated in a manner as will be discussed below.

Dry to the Touch Time

Dry to the touch time was determined according to a method based on JIS K 5400 at 10-minutes intervals at 25° C. in summer and 10° C. in winter, respectively.

Condition of coated films at the time of 72 hours after application was evaluated as in the following:

Transparency

The coated film was visually evaluated based on JIS K 5400.

Hardness of Film

The hardness of the film was evaluated according to the pencil scratch test on JIS K 5400.

Transparent silicone film-forming compositions prepared as examples were applied on glass test pieces (70 mm in width×110 mm in length×5 mm in thickness) and dried in a similar manner as described above. Ultraviolet transmission of each glass test piece was determined as in the following after air-drying for 24 hours.

Ultraviolet Emission

Each test piece was evaluated by determining the ultraviolet transmission at a wave length of 345 nm by means of a spectrophotometer. The ultraviolet transmission was further determined at the time of 192 hours after the test pieces were kept in an accelerated light resistance testing device specified by JIS B 7754.

Infrared Trasmission

The infrared transmission was determined according to a method based on ISO 9050 by means of a spectrophotometer (Shimazu Double Chronometer).

With regard to the Examples, Control Examples and Reference Examples, the curing properties of each composition are shown in Table 2 below.

TABLE 2

|  | drying time (hr) season | surface hardness | transmission UV (%) | transmission IR (%) | hardness after 2 hrs | hardness after 72 hrs |
|---|---|---|---|---|---|---|
| Ex. 1 | summer 0.5 | HB | 0 | 60 | 3H | 7H |
|  | winter 1 | HB | 0 | 61 | 3H | 7H |
| Cont. 1 | summer 0.5 | B | 0 | 89 | 5H | 6H |
|  | winter 1 | B | 0 | 88 | 4H | 6H |
| Ex. 2 | summer 0.5 | 2H | 33 | 58 | 4H | 8H |
|  | winter 1 | 2H | 33 | 59 | 4H | 8H |
| Cont. 2 | summer 0.5 | H | 82 | 89 | 4H | 6H |
|  | winter 1 | H | 82 | 89 | 4H | 5H |
| Ex. 3 | summer 0.5 | H | 0 | 58 | 4H | 6H |
|  | winter 1 | H | 0 | 58 | 4H | 6H |
| Cont. 3 | summer 0.5 | HB | 0 | 87 | 2H | 5H |
|  | winter 1 | HB | 0 | 89 | 2H | 4H |
| Ex. 4 | summer 0.5 | 3H | 0 | 57 | 6H | ≧9H |
|  | winter 1 | 3H | 0 | 58 | 6H | ≧9H |
| Cont. 4 | summer 0.5 | 2H | 0 | 89 | 6H | 9H |
|  | winter 1 | 2B | 0 | 88 | 6H | 9H |
| Ex. 5 | summer 0.5 | 2H | 0 | 56 | 5H | 9H |
|  | winter 1 | 2H | 0 | 56 | 5H | 9H |
| Cont. 5 | summer 0.5 | H | 0 | 77 | 2H | 6H |
|  | winter 1 | H | 0 | 76 | 2H | 5H |
| Ex. 6 | summer 0.5 | 2H | 0 | 3 | 5H | 6H |
|  | winter 1 | 2H | 0 | 10 | 4H | 6H |
| Cont. 6 | summer 0.5 | H | 0 | 25 | 3H | 6H |
|  | winter 1 | H | 0 | 28 | 2H | 5H |
| Ref. 1 | summer 1 | 2H | — | — | 3H | 3H |
| Ref. 2 | summer 1 | 4H | — | — | 4H | 4H |
| Ref. 3 | summer 1 | H | — | — | 2H | 2H |
| Ref. 4 | summer 1 | 2H | — | — | 2H | 2H |

UV and IR transmission were determined according to ISO 9050 by means of a spectrophotometer (Shimazu Double Chronometer).

Tables 1 and 2 show that the present invention provides a transparent silicone film-forming composition which does not cause insufficient coating- and color uniformity, and is curable at room temperature within a short period of time, thereby forming an attractive and weather-resistant film having a film hardness of 6H to 9H or more after the film is cured acceleratingly under a condition of an ordinary environment, i.e., at normal temperatures in the air. Further, the composition of the present invention comprising an infrared-absorbing agent other that essential components makes it possible to control thermal emission and dew condensation in the room in winter time when such a composition is applied to windows, because the film absorbs infrared light and keeps heat therein.

What is claimed is:

1. A transparent silicone film-forming composition comprising a reaction product of an alkoxysilane having an epoxy group and an alkoxysilane having an amino group with an active hydrogen, an acid catalyst, a finely ground ITO cocatalyst and at least one solvent.

2. The transparent silicone film-forming composition claimed in claim 1 which comprises a reaction product of an alkoxysilane having an epoxy group and alkoxysilane having an amino group with an active hydrogen as well as tri- or dialkoxysilane, monoalkoxysilane and/or glycidesilane.

3. The transparent silicone film-forming composition claimed in claim 1 further comprising one or more than two components selected from ultraviolet-absorbing agents, infrared-screening- or infrared-absorbing agents and a dye and/or pigment.

4. The transparent silicone film-forming composition claimed in claim 1 in which the alkoxysilane having an amino group with an active hydrogen is N-(β-aminoethyl)-γ-aminopropyltrimethoxysilane.

5. The transparent silicone film-forming composition claimed in claim 1 comprising one or more solvents selected from alcoholic-, ketone ether solvents, and a solvent having two or more functional groups selected from the group consisting of diethylene glycol diethyl ether, propylene glycol monoethyl ether acetate and dipropylene glycol monomethyl ether propanol.

6. A method of curing a silicone film-forming composition comprising a step of curing a reaction product of an alkoxysilane having an epoxy group and an alkoxysilane having an amino group with an active hydrogen in the presence of an acid catalyst and a finely ground ITO cocatalyst.

* * * * *